(12) United States Patent
Wilson et al.

(10) Patent No.: US 8,817,402 B2
(45) Date of Patent: Aug. 26, 2014

(54) TAG MULTIPLICATION VIA A PREAMPLIFIER INTERFACE

(71) Applicant: LSI Corporation, Milpitas, CA (US)

(72) Inventors: Ross S. Wilson, Menlo Park, CA (US); Richard Rauschmayer, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/719,615

(22) Filed: Dec. 19, 2012

(65) Prior Publication Data

US 2014/0168809 A1    Jun. 19, 2014

(51) Int. Cl.
*G11B 5/09* (2006.01)
*G11B 20/10* (2006.01)

(52) U.S. Cl.
CPC ............... *G11B 20/10222* (2013.01)
USPC .................................. 360/46; 360/51

(58) Field of Classification Search
None
See application file for complete search history.

(56) References Cited

U.S. PATENT DOCUMENTS

| | | | |
|---|---|---|---|
| 6,973,535 B2 | 12/2005 | Bruner et al. | 711/112 |
| 7,558,012 B2 | 7/2009 | Lee | 360/31 |
| 8,001,321 B2 | 8/2011 | Bruner et al. | 711/111 |
| 2008/0204914 A1* | 8/2008 | Hashizume | 360/46 |
| 2010/0110573 A1* | 5/2010 | Tang | 360/51 |
| 2012/0275278 A1* | 11/2012 | Wilson | 369/13.24 |
| 2013/0076552 A1* | 3/2013 | Nam et al. | 341/164 |

FOREIGN PATENT DOCUMENTS

EP    0595454 A2    5/1994 ............ G11B 20/10

* cited by examiner

*Primary Examiner* — Regina N Holder
(74) *Attorney, Agent, or Firm* — Christopher P. Maiorana, PC (57) ABSTRACT

An apparatus having a controller and a preamplifier is disclosed. The controller may be configured to generate information on a serial bus coupled to a preamplifier interface. The preamplifier may be configured to (i) generate a count value in response to a clock signal synchronized to a recording medium and (ii) generate a plurality of tag signals based on the information and the count value. The tag signals may gate a read operation and a write operation of the preamplifier.

20 Claims, 5 Drawing Sheets

TAG MULTIPLICATION VIA A PREAMPLIFIER INTERFACE

FIELD OF THE INVENTION

The present invention relates to storage devices generally and, more particularly, to a method and/or apparatus for implementing tag multiplication via a preamplifier interface in a storage device.

BACKGROUND OF THE INVENTION

In conventional disk drives, a controller communicates with a channel circuit, a preamplifier and other elements with a synchronous bus. Clock and data wires of the bus are routed in parallel. Format-control tag signals are time critical and so are not transferred via the bus. The tag signals are commonly generated by sequencers embodied in the controller and transferred on dedicated wires. Mode switching in both the channel circuit and the preamplifier are controlled by the tag signals. As system features proliferate to serve bit-patterned media (i.e., BPM), heat-assisted magnetic recording (i.e., HAMR) and flyheight control, additional precisely-timed tags will be implemented. Such signals will add wires on the channel-to-preamplifier interface. The additional wires consume die pads and cause new traces to be added to an actuator flex-cable.

It would be desirable to implement a tag multiplication via a preamplifier interface.

SUMMARY OF THE INVENTION

The present invention concerns an apparatus having a controller and a preamplifier. The controller may be configured to generate information on a serial bus coupled to a preamplifier interface. The preamplifier may be configured to (i) generate a count value in response to a clock signal synchronized to a recording medium and (ii) generate a plurality of tag signals based on the information and the count value. The tag signals may gate a read operation and a write operation of the preamplifier.

The objects, features and advantages of the present invention include providing tag multiplication via a preamplifier interface that may (i) reduce line/pad count of a preamplifier-to-channel interface as new features are added, (ii) preserve existing interface protocols, aiding back-compatibility with current designs, (iii) provide a self-contained tag generator within the preamplifier, (iv) be synchronized to a byte rate clock, (v) be synchronized to a disc surface format, (vi) minimize the number of additional signals, (vii) maintain precise timing and/or (viii) be implemented as one or more integrated circuits.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention may augment a number of format-control tags available on a standard preamplifier-to-channel interface (or port), as an extension of a current industry-standard interface. The time-critical tags may be generated within a preamplifier circuit without using additional signaling wires connected to a controller circuit. Other timing signals that are currently generated by the controller circuit may also be generated internal to the preamplifier circuit and/or a channel circuit.

Figure 1:
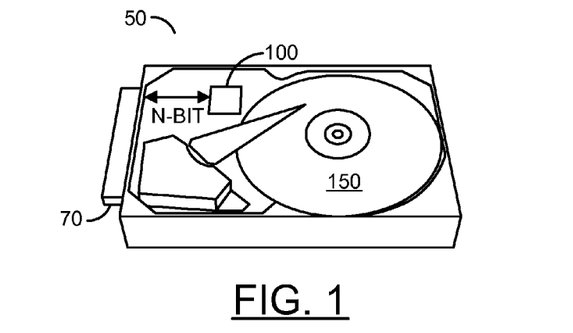
FIG. 1 is a block diagram illustrating a context of the present invention.

Referring to FIG. 1, a block diagram of a disc drive 50 is shown. The disc drive 50 generally comprises an interface 70, a block (or circuit) 100 and a disc (or medium or media) 150. The circuit 100 may be implemented as an electronics module. The circuit 100 may be implemented as a controller circuit that may be used to control reading and/or writing to the disc 150. In some embodiments, the circuit 100 may be fabricated as one or more integrated circuits. The disc 150 may be implemented, in an example, as a rotating disc. The circuit 100 may communicate with an external device, such as a computer through the interface 70. In an example, the disc drive 50 may be implemented as a hard disc drive (e.g., HDD). In another example, an optical disc drive may be implemented. The particular type of drive and/or media implemented may be varied to meet the design criteria of a particular implementation.

Figure 2:
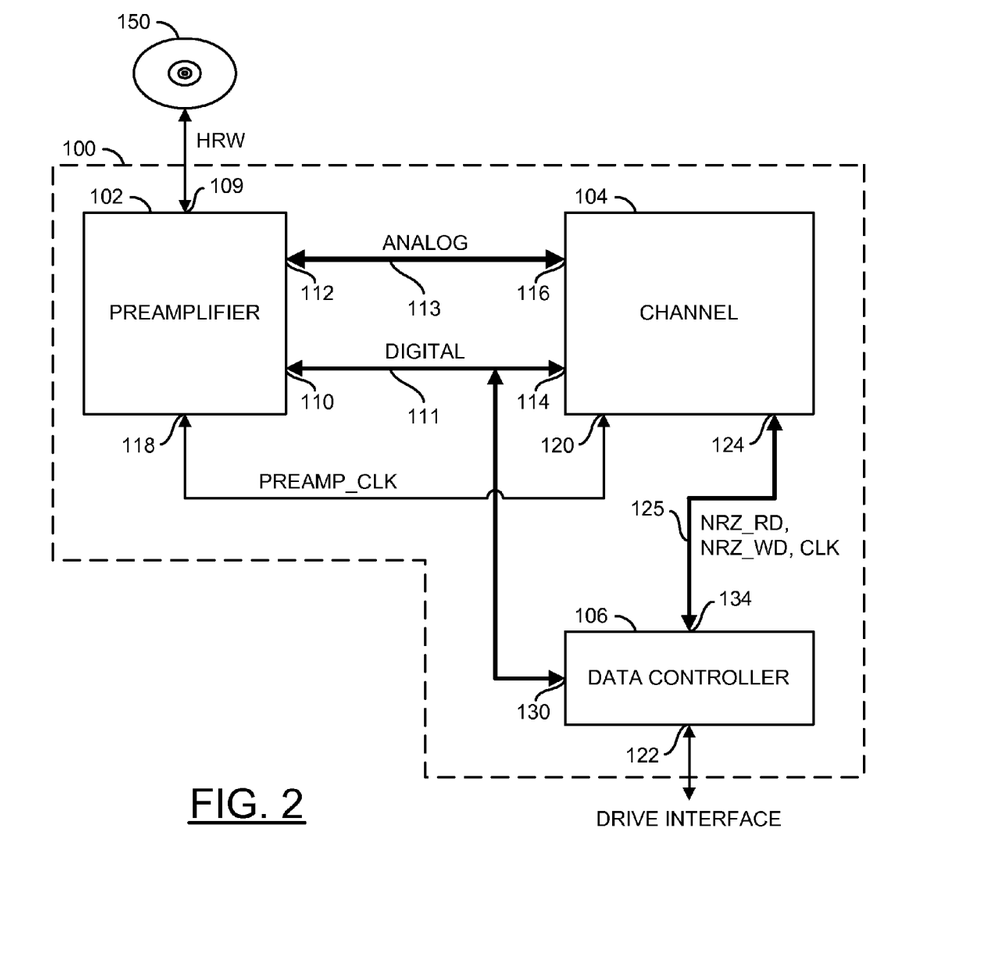
FIG. 2 is a more detailed block diagram of the present invention.

Referring to FIG. 2, a block diagram of circuit 100 is shown in accordance with an embodiment of the present invention. The circuit 100 generally comprises a block (or circuit) 102, a block (or circuit) 104 and a block (or circuit) 106. The circuit 102 may be implemented as a preamplifier circuit. The circuit 104 may be implemented as a channel (e.g., a recording channel) circuit. The circuit 106 may be implemented as a data controller. In an example, the circuit 106 may be implemented as a data controller and/or control microprocessor circuit. The circuits 102, 104 and 106 may represent modules and/or blocks that may be implemented as hardware, software, a combination of hardware and software, or other implementations.

The circuit 102 may have an input/output 109, an input/output 110, an input/output 112 and an input 118. The input/output 110 may receive/transmit a signal (e.g., DIGITAL) over a bus 111. In an example, the bus 111 may be implemented as a high speed serial bus. In another example, the bus 111 may be implemented as a three-line synchronous serial bus having separate clock, serial data and enable lines.

The signal DIGITAL, of which the serial bus is a part, may represent one or more digital control and/or data signals. The digital control signals may be multiplexed and/or transmitted as the signal DIGITAL. By multiplexing the digital control signals, the number of bond pads (or connections) between the preamplifier 102, the channel 104 and the controller 106 may be minimized. The particular protocol implemented and/or or used to transmit and/or multiplex the signal DIGITAL may be varied to meet the design criteria of a particular implementation. The format of the multiplexing of the signal DIGITAL generally provides time slots for programmability of parameter registers and the like. In an example, the multiplexing of the signal DIGITAL may provide updates at submultiples of a system bit rate. Parameter set-up information may also be transmitted over the bus 111. The high speed digital bus 111 may also reduce the total number of interconnects between the preamplifier 102 and the channel 104.

The input/output 112 may receive/transmit a signal (e.g., ANALOG) over a bus 113. The bus 113 may represent a group of lines between the preamplifier 102 and the channel 104. The signal ANALOG may represent one or more analog read (e.g., RD) and/or write (e.g., WR) data signals. The signal ANALOG generally represents data read from or written to the disc 150. During write operations, the circuit 102 delivers over wires 109 a high-level analog signal to the write head serving disc 150. Correspondingly, during read operations, wires 109 convey a low-level read signal from read head serving disc 150 to the preamplifier 102. The circuit 102 may present/receive a read or write signal (e.g., HRW) on the input/output 109 in response to the signal DIGITAL and the signal ANALOG. The signal HRW may represent low-level analog read signals and/or high-level analog write data signals in a format to be read/written to/from the disc 150.

The input 118 may receive a clock signal (e.g., PREAMP_CLK) from an output 120 of the channel 104. The signal PREAMP_CLK may be locked (or synchronized) to a format recorded in (on) the disc 150. In some embodiments, the signal PREAMP_CLK may toggle multiple times as a head of the drive 50 enters (or passes over) data fields of the disc 150.

The circuit 104 may have an input/output 114 that may present/receive the signal DIGITAL from the bus lll and an input/output 116 that may present/receive the signal ANALOG from the bus 113. The circuit 104 may also have an output 120 for the signal PREAMP_CLK and an input/output 124 connected to a bus 125.

The circuit 106 may have an input/output 130 that may present/receive the signal DIGITAL from the bus 111. An input/output interface 122 may also be provided in the circuit 106 to communicate through the interface connector 70. The circuit 106 may also have an input/output 134 that may present/receive data on the bus 125.

The input/output 124 may present a number of control signals, including NRZ_RD (e.g., non-return to zero read data), write data (e.g., NRZ_WD), and/or another clock signal (e.g., CLK). In the example shown, the channel 104 may communicate with the preamplifier 102 and the controller 106 using the signal DIGITAL over the bus 111. The signals transmitted on the bus 125 are generally mapped to the bus 111. The bus 111 may also convey additional information that originates from the channel 104. The bus 111 generally provides a direct communication among the preamplifier 102, the channel 104 and the controller 106.

Each circuit 102, 104 and 106 may be implemented as a separate integrated circuit (or block). In some embodiments, two or more of the circuits 102, 104 and/or 106 may be implemented in the same integrated circuit.

In general, the preamplifier 102 maybe implemented using a process technology optimized for transmission and/or processing of analog signals. For example, the preamplifier 102 may be implemented using bi-polar (or bi-CMOS or CMOS) processing technology. The channel 104 may be implemented using a process technology optimized for the transmission and/or processing of digital signals. For example, the channel 104 may be implemented using a CMOS processing technology.

The controller 106 generally receives data transfers and access positioning orders from the interface 70. The controller 106 may also provide data buffering and translates orders into commands to the preamplifier 102, the channel 104 and servo power drivers (not shown).

During writes, the preamplifier 102 and the channel 104 may serialize, encode, write precompensate and otherwise prepare the write data WD received from the controller 106 over bus 125 to a form that may be recorded in (on) the disc 150. During reads, the preamplifier 102 and the channel 104 generally cooperate to amplify the low-level playback signal produced by the heads/media. The amplified read signal may subsequently be equalized, detected, deserialized and clock-recovered. The deserialized NRZ read data (e.g., NRZ_RD) and the clock signal CLK may be delivered to the controller 106 via the bus 125.

The channel 104 generally implements the channel functions associated with the read operations. A channel AFE (e.g., analog front end) function may regulate signal amplitude of the analog read signal received from the preamplifier 102 via the bus 113. An anti-alias and response-shaping function may filter the signal that is subsequently presented to an analog-to-digital function for digitization. The AFE may also contain additional functions such as adaptive magneto-resistance (e.g., MR) head nonlinearity compensation.

The controller 106 generally communicates with the channel 104, the preamplifier 102 and other elements with the bus 111. Clock and data lines of the bus 111 may be routed in parallel to all attached blocks. Accordingly, each block may contain control and status registers.

Figure 3:
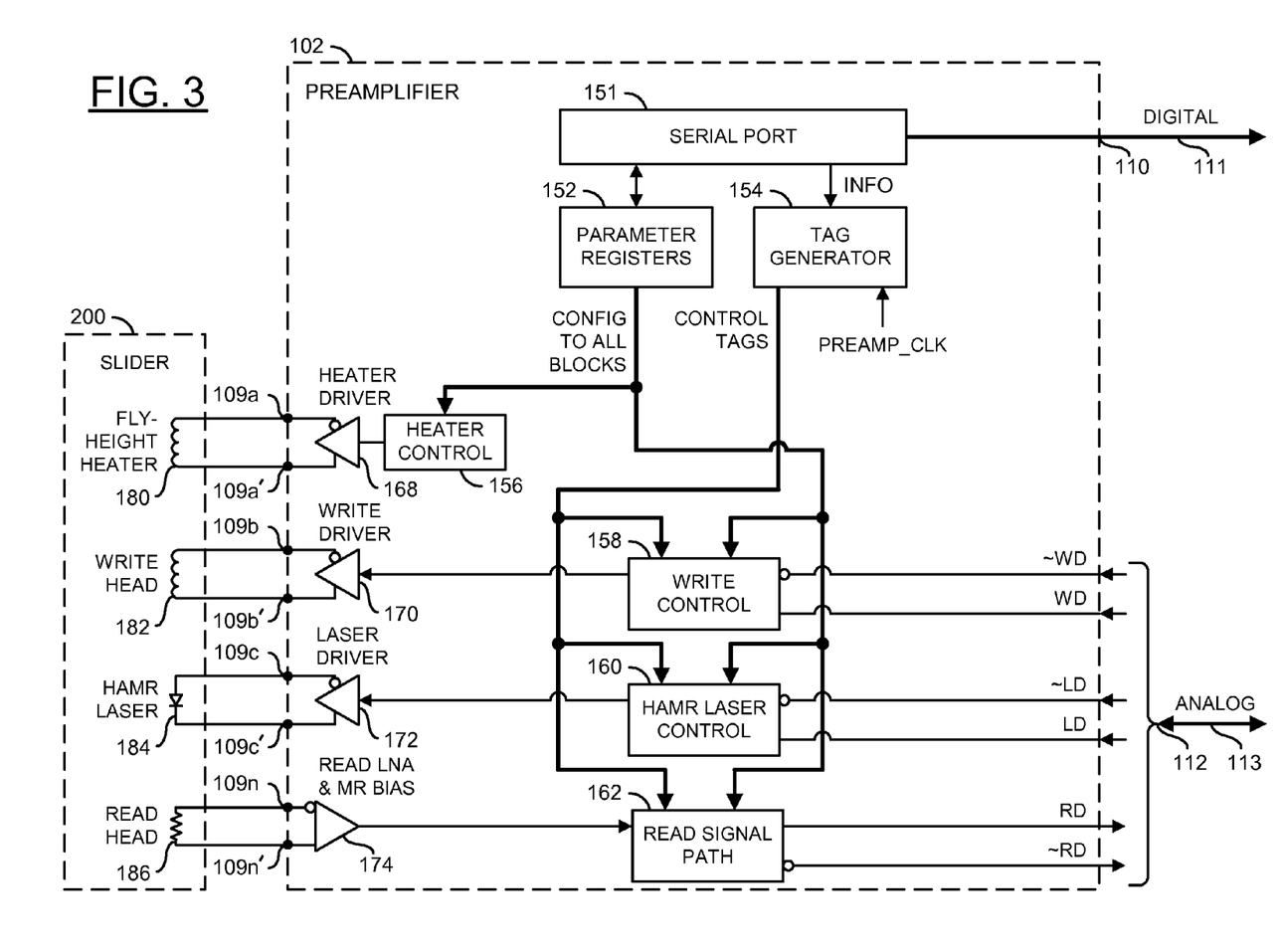
FIG. 3 is a diagram of the preamplifier of FIG. 2.

Referring to FIG. 3, a detailed diagram of the preamplifier 102 is shown. The preamplifier 102 generally comprises a serial port circuit 151, a parameter register circuit 152, a block (or circuit) 154, a block (or circuit) 156, a block (or circuit) 158, a block (or circuit) 160, a block (or circuit) 162 and a plurality of blocks (or circuits) 168, 170, 172 or 174. The circuit 152 may be implemented as a parameter register circuit. The circuit 154 may be implemented as a tag generator circuit. The circuit 156 may be implemented as a heater control circuit. The circuit 158 may be implemented as a write control circuit. The circuit 160 may be implemented as a laser control circuit. The circuit 162 may be implemented as a read signal path. The circuit 168 may be implemented as a heater driver circuit. The circuit 170 may be implemented as write driver circuit. The circuit 174 may be implemented as a read driver circuit. A slider circuit 200 is also shown. The slider 200 may be implemented as part of the drive 50. The slider 200 "flies" above the recording surface of the disc 150. For example, the slider 200 may slide on a thin air film to move over individual tracks of the disc 150. The slider 200 generally contains a fly height heater 180, a write head 182, a heat-assisted magnetic recording (e.g., HAMR) laser 184 and/or a read head 186. An information signal (e.g., INFO) may be generated by the serial port circuit 151 and transferred to the tag generator 154. The signal PREAMP_CLK may be received by the tag generator 154.

During write operations, the preamplifier 102 and/or the recording channel 104 may serialize and/or encode NRZ write data received from the controller 106 through the bus 125. The format of encoding may be in a form that may be recorded on the disc 150 after high power amplification by the write control circuit 158 and/or the write driver circuit 170 in the preamplifier circuit 102. During read operations, the preamplifier circuit 102 and/or the recording channel 104 may cooperate to amplify one or more low-level playback signals produced by the read head 186. The channel 104 may amplify and/or filter signals in the analog domain, equalize, detect, deserialize the signal and/or recover the clock signal CLK and/or deliver the NRZ read data through the bus 125.

The channel 104 may contain a modest amount of analog functionality to process the amplified readback signal delivered by the preamplifier 102. Signal amplitude regulation (e.g., automatic gain control), high-order lowpass anti-alias filtering/boosting, and/or asymmetry correction, may be performed by the preamplifier 102.

The CMOS process used to implement the channel 104 may be ill-equipped to implement precision analog circuits of the preamplifier 102. Locating the analog circuits in the preamplifier 102 may provide a more robust and/or accurate analog bi-polar implementation. For example, a variable gain amplifier (e.g., VGA) and/or an automatic gain control (e.g., AGC) function may be implemented in the preamplifier 102. Loop transport delay of VGA gain updates are normally minimized by using high update rates.

The circuit 100 may be implemented to provide a channel-to-preamplifier interface. Availability of the high speed link on the bus 111 between the preamplifier 102 and the channel 104 may allow read/write mode control changes and/or status presentation from the preamplifier 102 to be signaled without use of dedicated tags and/or with modest latency.

The circuit 100 may incorporate the high-speed serial bus 111 to join the channel 104, the preamplifier 102 and the controller 106. To reduce wire count, the signal DIGITAL may employ differential self-clocked current-mode signaling (e.g., to aid fast turnaround). For example, a self-clocking data format (e.g., 8b/10b) may be further extended by multi-level signaling. Alternatively, the signal DIGITAL may contain a dedicated clock line, removing the need for a phase-locked loop in the serial port circuit 151. A self-clocking data format is normally not implemented when an external clock is implemented. The bus 111 may be supported in the controller 106, the channel 104 and/or the preamplifier 102 by serial port circuits. A wide choice of techniques and/or signaling protocols may be used to implement the bus 111. For example, the bus 111 may include lines for a serial port clock (e.g., SPC) signal, a serial port data (e.g., SPD) signal and serial port enable (e.g., SPE) signal.

In an example, the circuit 100 may include pre-emphasis or adaptive equalization (e.g., which may increase bit rate), which may be simplified if the physical length of PCB traces implementing bus 111 between the channel 104 and/or the preamplifier 102 are short (e.g., less than 10 centimeters). To minimize logic in the preamplifier 102, an adaptive portion of such equalization may be implemented in the channel 104. The result transmitted (e.g., a low bit rate, perhaps not implementing equalization), may be set to one or more taps of an equalizing FIR in the preamplifier 102 during a setup phase. In an implementation, most transactions on bus 111 concern transmissions from the channel 104 to the preamplifier 102. In addition, readback capability from the preamplifier 102 may be provided to support additional functions (e.g., status/fault indication, etc.).

Existing read/write signal differential pairs (e.g., RD/~RD and/or WD/~WD) used by the write controller 158 and the read signal path 162 may remain unchanged from previous implementations. The signals RD/~RD and/or WD/~WD may, in an example, be multiplexed in various ways in accordance with write and/or read-mode data transfer specifications. In a HAMR recording system, an additional laser control signal (e.g., LD/~LD) may be generated by the HARM laser control 160. A heater signal may be generated by the heater control 156. The signal LD/~LD may be multiplexed, for example, along with the signals RD/~RD. As described, read and write operations are generally mutually exclusive.

Figure 4:
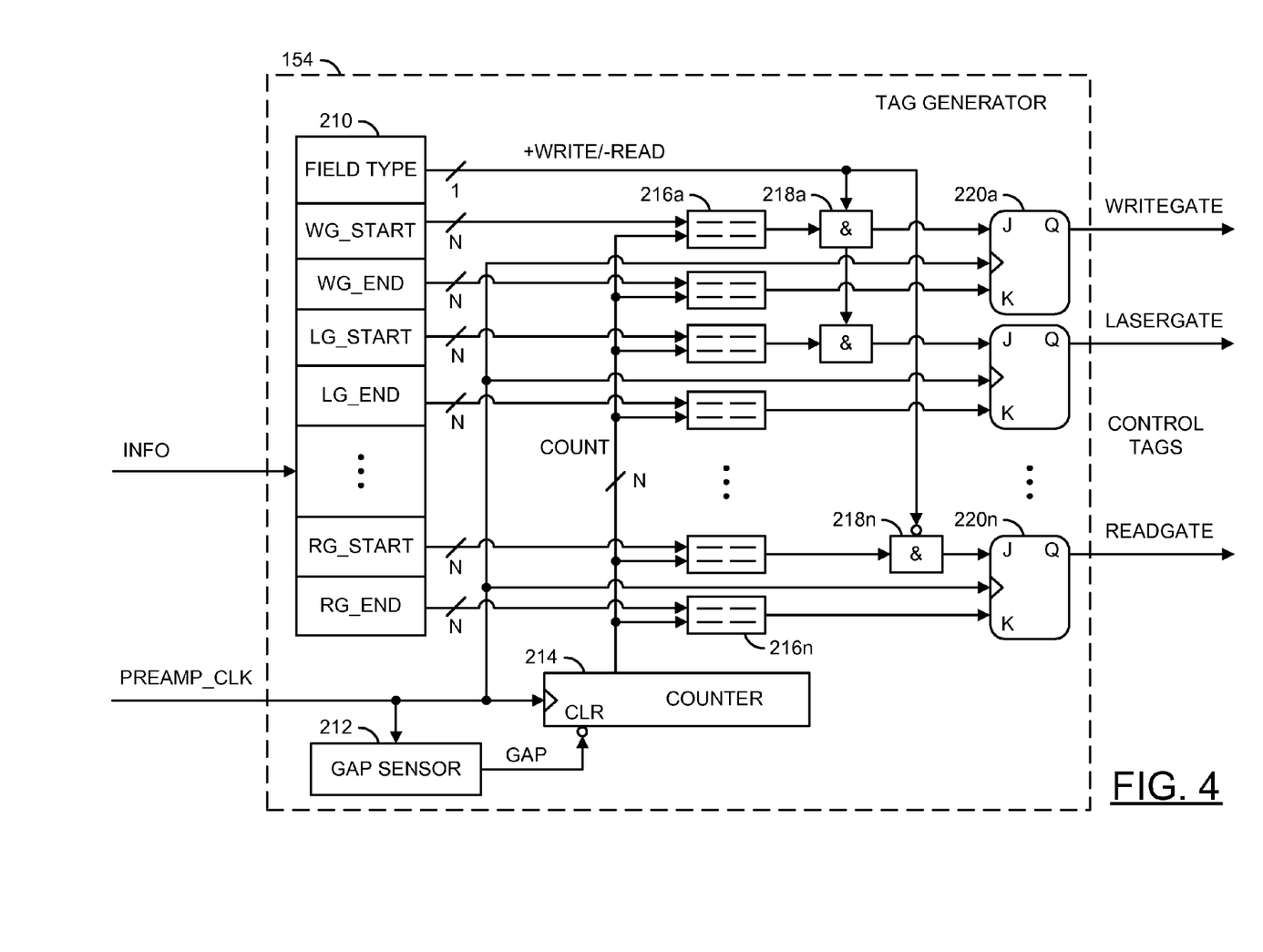
FIG. 4 is a diagram of the tag generator of FIG. 3.

Refer to FIG. 4, a detailed block diagram of the tag generator circuit 154 is shown. The purpose of Tag Generator circuit 154 is to generate control signals within the preamplifier 102, that otherwise would have to be transmitted as additional wires within the bus 111. Doing so may reduce the number of chip bond pads and flex-circuit traces required, enhancing economy. The tag generator 154 generally comprises a block (or circuit) 210, a block (or circuit) 212, a block (or circuit) 214, multiple blocks (or circuits) 216a-216n, multiple blocks (or circuits) 218a-218n and multiple blocks (or circuits) 220a-220n. The circuit 210 may be implemented as a register-file circuit. The circuit 212 may implement a gap sensor circuit. The circuit 214 may implement a binary counter circuit. Each circuit 216a-216n may implement an equal comparator circuit. Each circuit 218a-218n may implement a logical AND gate. Each circuit 220a-220n may implement a flip-flop (e.g., S-R or J-K) circuit.

The signal INFO may be received by the register-file 210. The clock signal CLK may be received by the gap sensor 212, the counter 214 and each flip-flop 220a-220n. A signal (e.g., GAP) may be generated by the gap sensor 212 and transferred to the counter 214. A count signal (e.g., COUNT) may convey a current multi-bit (e.g., N bit) count value from the counter 214 to each circuit 216a-216n. The register-file 210 may present a signal (e.g., +WRITE/−READ) to the AND gates 218a-218n. Each flip-flop 220a-220n may generate a corresponding gate signal (e.g., WRITEGATE, LASERGATE and READGATE).

The counter 214 generally has a count capacity at least as great as a number of transitions of the clock signal PREAMP_CLK over a length of a longest format field in the disc 150 to be processed. The flip-flops 220a-220n generally produce the synthesized control tags for use in the preamplifier 102. The tags may replace common write-gate tags and read-gate tags delivered to the preamplifier 102 over dedicated lines. Additional numbers and types of the tag signals may be generated. For example, the tag generator 154 may generate control tag signals internal to the preamplifier 102, including, but not limited to, a reader squelch signal.

Figure 5:
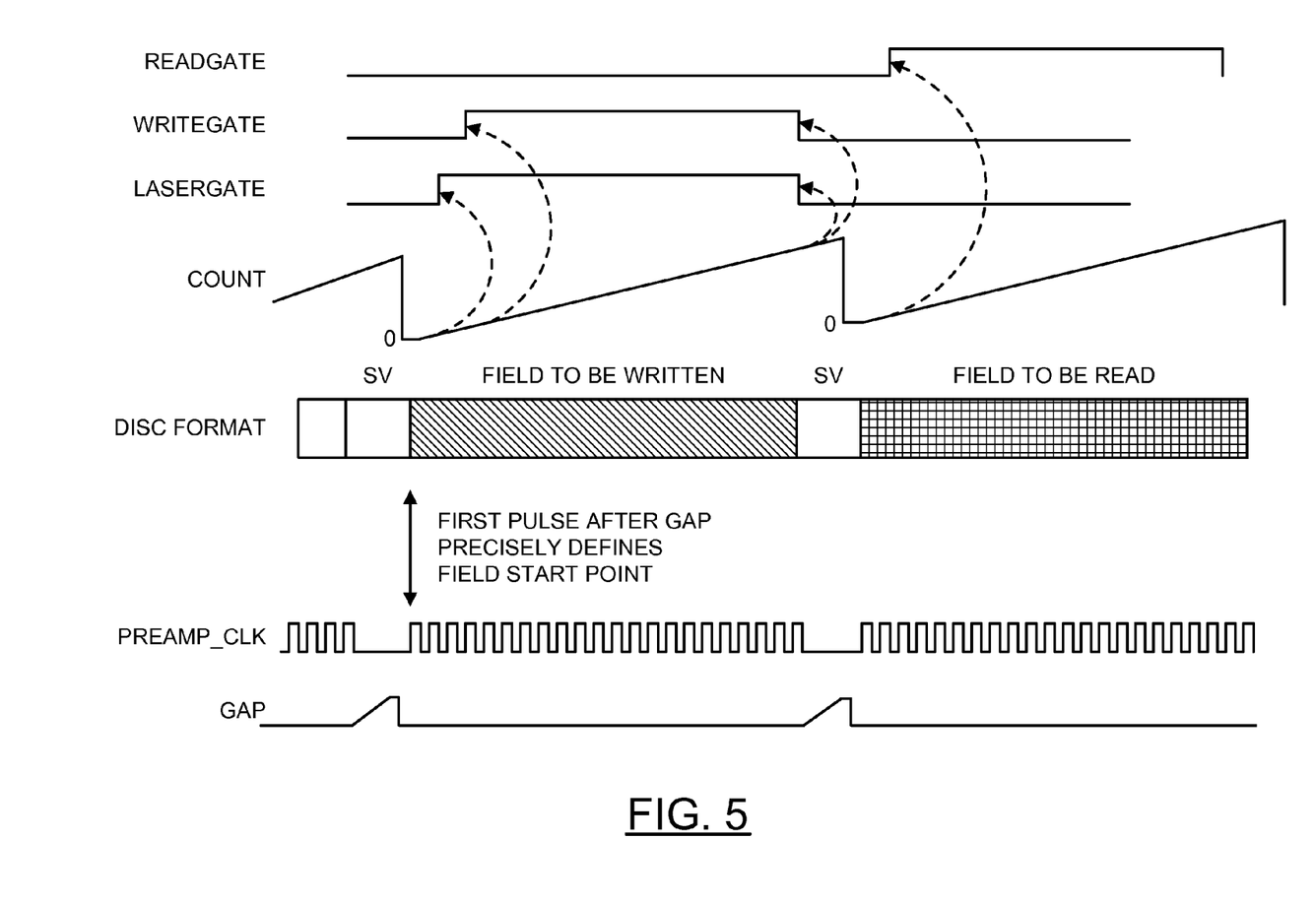
FIG. 5 is a diagram illustrating various waveforms of the present invention.

Referring to FIG. 5, a diagram of several signals used in the tag generator 154 are shown. In operation, the channel 104 may generate the clock signal PREAMP_CLK at a rate (e.g., a byte rate) locked to the disc format. The clock signal PREAMP_CLK generally toggles during the data fields (e.g., fields to be written and fields to be read) and remains steady during servo sectors (e.g., SV). In advance of every data field, the counter 214 may be asynchronously (or synchronously) reset. The reset is generally accomplished by the gap sensor 212. The gap sensor 212 may be implemented as a periodically reset charging capacitor and an analog comparator. Alternatively, a dedicated line may be used, such as a special hardware-decoded sequence on the bus 111.

Returning to FIG. 4, the signal INFO generally loads information into the register-file 210. The information may include, but is not limited to, a write gate start value, a write gate end value, a laser gate start value, a laser gate end value, a read gate start value, a read gate end value and an optional field type word. Some or all of the values may be presented as multiple (e.g., N) parallel bits to the comparators 216a-216n. The field type word may be presented from the register-file 210 a bit at a time to the AND gates 218a-218n, as clocked by the signal GAP.

Once reset, the counter 214 generally remains dormant (e.g., count value=zero) until an edge of the signal PREAMP_CLK is received. The initial edge of the signal CLK may define a start point of each data field and so precisely aligns the counter sequence with the disc format. As the count value in the signal COUNT increments, the comparators 216a-216n may decode specified states to initiate (or start) and terminate (or end) specific tags by setting/resetting the flip-flops 220a-220n. The flip-flops 220a-220n may be clocked synchronously with the counter 214 by the signal PREAMP_CLK. For example, a low count value (e.g., 1) may cause the comparator 216c to set the flip-flop 220b and thus assert the signal LASERGATE in an enabled (e.g., high) state. At a later count value (e.g., 4), the comparator 216a may set the flip-flop 220a to assert the signal WRITEGATE in the enabled state. At a later count value (e.g., 132), the comparators 216b and 216d may reset the flip-flops 220a and 220b to deassert the signals WRITEGATE and LASERGATE to a disabled (e.g., low) state. In some configurations (e.g., that the preamplifier 102 is the only device served by bus 111), a line of the bus 111 may be used to carry the clock signal CLK.

Figure 6:
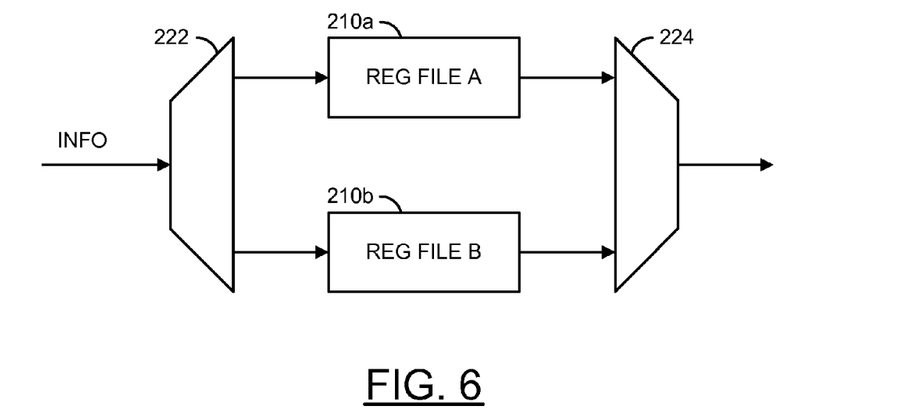
FIG. 6 is a partial block diagram of another implementation of the tag generator.

Referring to FIG. 6, a partial block diagram of another implementation of the tag generator 154 is shown. The tag generator 154 may include a block (or circuit) 222 and a block (or circuit) 224. The register-file 210 may be implemented as multiple (e.g., two) register-files 210a-210b. The circuit 222 may be implemented as a demultiplexer circuit. The circuit 224 may be implemented as a multiplexer circuit.

If the controller 106 is fast enough to update the register-file 210 during a single format field, the register-file 210 may be implemented as a double-buffered register set 210a-210b, allowing microcode to update a register set (e.g., 210b) through the demultiplexer 222 while the counterpart (e.g., 210a) is serving as a comparison reference through the multiplexer 224. To relieve the controller microcode of a criterion to track the disc format, the controller 106 may be provided with a block-burst download sequencer that rapidly loads the register-file 210.

If not, a field type register may be provided in the register-file 210. The file type register generally shifts a single bit of the field type word for each cycle of the signal GAP. For example, if the field type register were loaded with binary value 01110100, a field-processing sequence on the disc 150 may be R-W-W-W-R-W-R-R.

The application of the techniques described above, in concert with use in the channel of a burst-oriented controller 106 attached to the existing three-wire serial bus 111, may be sufficient to support additional preamplifier-to-channel features specifying tightly-linked transfer of data between the channel 104 and the preamplifier 102.

The functions performed by the diagrams of FIGS. 1-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a controller configured to generate information on a serial bus coupled to a preamplifier interface; and
a preamplifier configured to (i) generate a count value in response to a clock signal synchronized to a recording medium and (ii) generate a plurality of tag signals based on said information and said count value, wherein said tag signals gate a read operation and a write operation of said preamplifier.

2. The apparatus according to claim 1, wherein said preamplifier comprises a register file configured to parse said information into (i) a plurality of start values and (ii) a plurality of end values.

3. The apparatus according to claim 1, wherein said preamplifier further comprises a plurality of comparators configured to generate a plurality of start signals and a plurality of end signals by comparing a plurality of start values and a plurality of end values to said count value.

4. The apparatus according to claim 1, wherein said preamplifier is further configured to parse said information into a field type word.

5. The apparatus according to claim 4, wherein said preamplifier comprises a plurality of AND gates configured to alternatively enable said read operation and said write operation in response to a sequence of bits in said field type word.

6. The apparatus according to claim 1, wherein said preamplifier is further configured to reset said count value prior to a head entering each data field of said recording medium.

7. The apparatus according to claim 1, wherein said preamplifier comprises a gap sensor configured to detect a plurality of gaps in said clock signal at each of a plurality of servo sectors of said recording medium, wherein said count value is reset in response to each of said gaps.

8. The apparatus according to claim 1, wherein a maximum value of said count value is at least as large as a number of cycles of said clock signal spanning each data field of said recording medium.

9. The apparatus according to claim 1, further comprising a channel circuit configured to (i) generate said clock signal and (ii) exchange a plurality of analog signals with said preamplifier.

10. The apparatus according to claim 1, wherein said apparatus is implemented as one or more integrated circuits.

11. A method for tag multiplication via a preamplifier interface, comprising the steps of:
    (A) generating information on a serial bus coupled to said preamplifier interface;
    (B) generating a count value in response to a clock signal synchronized to a recording medium; and
    (C) generating in a preamplifier a plurality of tag signals based on said information and said count value, wherein said tag signals gate a read operation and a write operation of said preamplifier.

12. The method according to claim 11, further comprising the step of:
    parsing said information into (i) a plurality of start values and (ii) a plurality of end values.

13. The method according to claim 11, further comprising the step of:
    generating a plurality of start signals and a plurality of end signals by comparing a plurality of start values and a plurality of end values to said count value.

14. The method according to claim 11, further comprising the step of:
    parsing said information into a field type word.

15. The method according to claim 14, further comprising the step of:
    alternatively enabling said read operation and said write operation in response to a sequence of bits in said field type word.

16. The method according to claim 11, further comprising the step of:
    resetting said count value prior to a head entering each data field of said recording medium.

17. The method according to claim 11, further comprising the step of:
    detecting a plurality of gaps in said clock signal at each of a plurality of servo sectors of said recording medium, wherein said count value is reset in response to each of said gaps.

18. The method according to claim 11, wherein a maximum value of said count value is at least as large as a number of cycles of said clock signal spanning each data field of said recording medium.

19. The method according to claim 11, further comprising the step of:
    generating said clock signal in a channel circuit that exchanges a plurality of analog signals with said preamplifier.

20. An apparatus comprising:
    means for generating information on a serial bus coupled to a preamplifier interface;
    means for generating a count value in response to a clock signal synchronized to a recording medium; and
    means for generating in a preamplifier a plurality of tag signals based on said information and said count value, wherein said tag signals gate a read operation and a write operation of said preamplifier.

* * * * *